United States Patent [19]

Fling

[11] Patent Number: 5,054,319

[45] Date of Patent: Oct. 8, 1991

[54] LIQUID LEVEL SENSOR AND METHOD

[76] Inventor: John J. Fling, 57 Hollister Ranch, Gaviota, Calif. 93117

[21] Appl. No.: 581,637

[22] Filed: Sep. 12, 1990

[51] Int. Cl.$^5$ ............................................. G01F 23/10
[52] U.S. Cl. .................................... 73/319; 73/293; 73/305; 73/322.5; 250/577
[58] Field of Search ............... 73/293 X, 308, 305 X, 73/313, 319, 322.5 X, 306; 250/577 X

[56] References Cited

U.S. PATENT DOCUMENTS

| | | | |
|---|---|---|---|
| 2,102,615 | 12/1937 | Cubete | 73/319 |
| 2,592,929 | 4/1952 | Matchett | 73/313 |
| 2,685,797 | 8/1954 | Morshel | 73/319 |
| 2,771,774 | 11/1956 | Fornasieri | 73/319 |
| 3,314,290 | 4/1967 | Schulte et al. | 73/290 |
| 3,555,904 | 1/1971 | Lenker | 73/313 |
| 4,064,754 | 12/1977 | Frey | 73/313 |
| 4,134,022 | 1/1979 | Jacobsen | 73/293 X |
| 4,692,023 | 9/1987 | Ohtomo et al. | 73/293 X |
| 4,745,293 | 5/1988 | Christensen | 73/293 X |
| 4,796,472 | 1/1989 | Lew | 73/313 |
| 4,833,919 | 5/1989 | Saito et al. | 73/313 |

FOREIGN PATENT DOCUMENTS

| | | | |
|---|---|---|---|
| 102390 | 6/1987 | European Pat. Off. | |
| 212585 | 12/1960 | Fed. Rep. of Germany | 73/319 |
| 2363787 | 5/1978 | France | 73/293 |
| 0074619 | 5/1980 | Japan | 73/293 |
| 0056223 | 4/1985 | Japan | 73/293 |
| 0300917 | 12/1988 | Japan | 73/319 |

Primary Examiner—William A. Cuchlinski, Jr.
Assistant Examiner—G. Bradley Bennett
Attorney, Agent, or Firm—Lynn & Lynn

[57] ABSTRACT

A liquid level sensor system includes a float assembly configured for placement in a liquid. The float assembly includes a float that is sufficiently buoyant to move the float assembly vertically in response to changes in the level of the liquid. The float assembly may comprise a buoyant member placed around a tube and constrained to movement only lengthwise along the tube in response to changes in the liquid level. A reflector is coupled to the float such that the position of the reflector is a function of the liquid level. A carriage may be placed inside the tube for moving with the float in response to changes in the liquid level, with the reflector being mounted to the carriage. The carriage and the float preferably are magnetically coupled together so that the carriage means moves lengthwise inside the tube in response to movement of the float assembly as the liquid level changes. A light source directs a light signal toward the reflector. Light reflected from the reflector is processed in a feedback loop to control the frequency of the feed back induced amplitude modulation of the light signal as a function of the optical path length, which depends upon the liquid level. The frequency of the amplitude modulated signal is measured to determine the liquid level.

17 Claims, 3 Drawing Sheets

LIQUID LEVEL SENSOR AND METHOD

BACKGROUND OF THE INVENTION

This invention relates generally to apparatus and methods for measuring liquid levels in a tank or any liquid/liquid or liquid/gas interface. More particularly, this invention relates to a fiber optic device for measuring liquid levels. Still more particularly, this invention relates to a fiber optic device for measuring liquid levels with accuracy suitable for detecting the existence of slow leaks theft, evaporation or environmentally induced changes in liquid levels.

Current techniques for measuring liquid levels in both underground and surface mounted tanks have the deficiencies of excessive complexity and cost or lack the intrinsic safety required for use with volatile liquids or liquids in explosive atmospheres.

There are substantial difficulties involved in making an accurate measurement of the amount of liquid contained in a bulk storage tank. Such tanks may be underground or have opaque walls, which prevents any direct visual inspection of the liquid depth. Typically liquid depths in bulk storage tanks are measured by inserting a long wooden pole into the tank and measuring the depth to which the liquid rose on the pole. This method is inherently inaccurate so that it is possible for a tank to leak part of the contents into the ground for a considerable time without the leak being noticed.

Great care must be exercised in measuring the depth of a liquid such as gasoline because of the risk of fire or explosion. The volatility of many liquids precludes the use of electrical depth measuring apparatus unless equipped with elaborate safety barriers. There is a need for an accurate technique for measuring fluid depths without increasing the risk of fire or explosion.

SUMMARY OF THE INVENTION

The present invention provides a fiber optic sensor system for determining the depth of a liquid or the depth of a heavy liquid overlaid by a lighter liquid. The invention introduces no electrical signal into the liquid and provides an accurate, reliable and inexpensive system for determining liquid depth.

The liquid level sensor system according to the present invention for sensing the level of a fluid in a tank or the like comprises a float assembly configured for placement in the liquid. The float assembly is sufficiently buoyant to move the float assembly vertically in response to changes in the level of the liquid. A reflector is coupled to the float assembly such that the position of the reflector is a function of the liquid level. The invention further includes means for directing a light signal toward the reflector. The light signal is preferably semicoherent or short coherence length light. The invention further includes means for processing the light reflected from the reflector such that a coherent oscillation in the amplitude of the light signal as a function of the liquid level occurs. The induced coherent oscillation frequency of the envelope of the light signals is then processed to determine the liquid level.

The invention may further comprise a tube formed for placement in the liquid, the tube being formed to have an outer surface and a lengthwise bore that defines an inner surface. The float assembly may further comprise a buoyant member placed around the tube and constrained to movement only lengthwise along the tube in response to changes in the liquid level. A carriage may be placed inside the tube for moving with the float in response to changes in the liquid level, with the reflector being mounted to the carriage.

The float assembly may further include a system of rollers mounted between the buoyant member and the tube to provide low friction contact between the float assembly and the outer surface of the tube. The carriage and the float preferably are magnetically coupled together so that the carriage means moves lengthwise inside the tube in response to movement of the float assembly as the liquid level changes. The carriage preferably includes a frame and a system of rollers mounted between the frame and the inner surface of the tube to provide low friction contact between the carriage and the tube.

The system according to the invention may further include a light source and an optical fiber having a first end arranged to receive light output from the light source and a second end arranged to direct light from the source toward the reflector. A lens may be fixed in the tube and arranged to focus light reflected from the reflector onto the second end of the optical fiber so that the optical fiber guides the reflected light back toward the optical source. The length of the optical fiber and the placement of the lens in the tube defines a fixed optical path length and the distance between the lens and the reflector defines a variable optical path that depends on the liquid level. The fixed optical path is preferably longer than the variable optical path to suppress undesired modes of oscillation. A portion of the reflected light is coupled out of the optical fiber to a photodetector that forms an electrical signal indicative of the amplitude of the reflected light.

The system preferably also further includes a bandpass filter for filtering the electrical signal and a modulator connected between the bandpass filter and the optical source. The modulator controls the drive current of the electrical source such that the optical source produces optical signals having a variation in frequency indicative of the distance between the second end of the optical fiber and the reflector. A frequency counter is connected to receive the electrical signal from the detector for determining the frequency of the reflected light, and a microprocessor or other suitable computing means is connected to the frequency counter for computing the liquid level as a function of frequency of the reflected light.

DESCRIPTION OF THE PREFERRED EMBODIMENT

Figure 1:
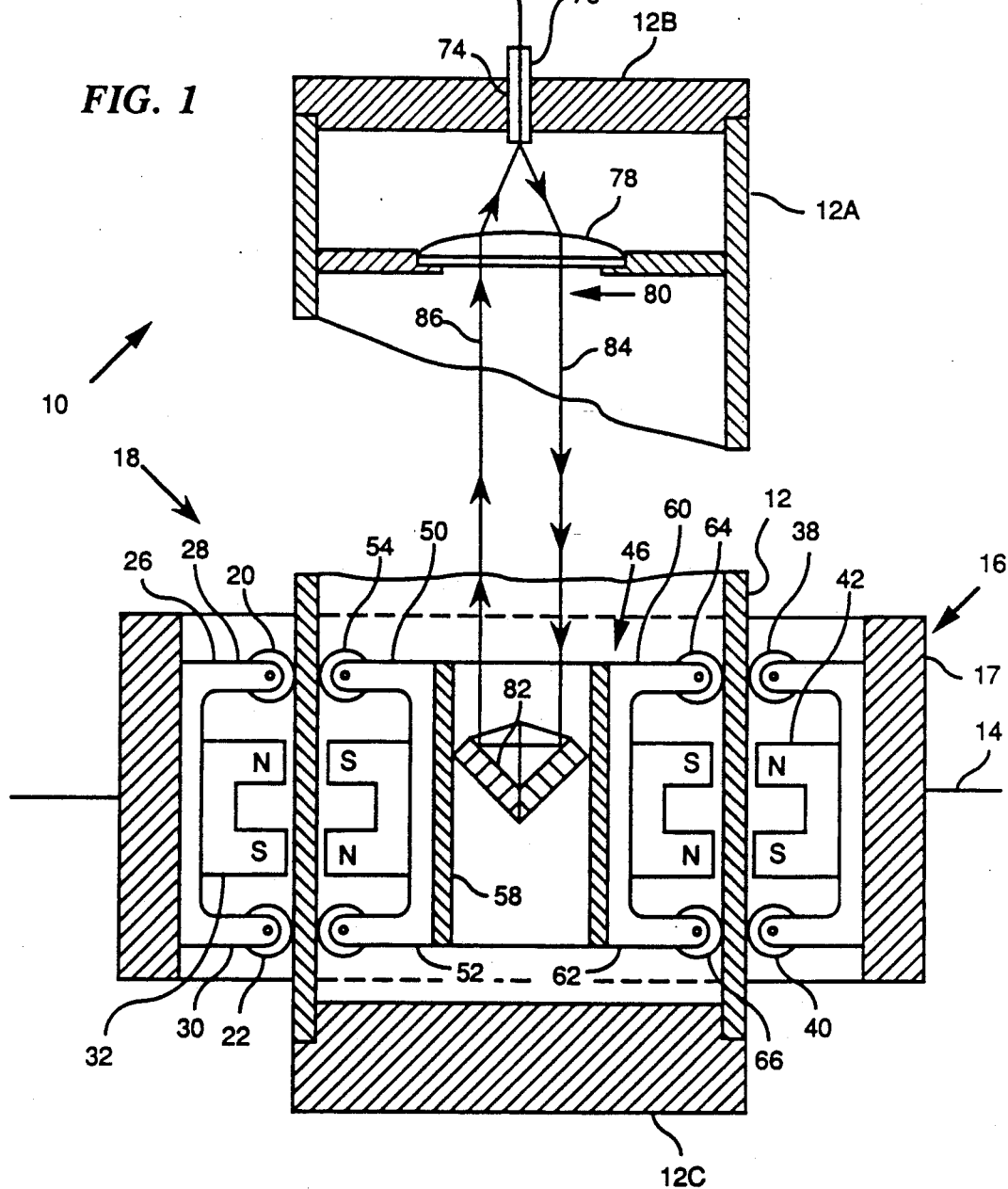
FIG. 1 is includes a cross sectional view of a liquid level sensor according to the present invention for insertion into a tank or the like to produce optical signals indicative of the liquid level in the tank and a schematic diagram of a system for processing the optical signals to sense the liquid level.

Referring to FIG. 1, the liquid level sensing apparatus 10 according to the present invention includes a sealed elongate tube 12. The tube 12 includes a side surface 12A and ends 12B and 12C. The tube 12 is placed in a tank or the like (not shown) for measuring the level of a liquid 14 therein. A float assembly 16 is placed around the sealed tube 12. The float assembly 16 is constrained to movement only along the length of the tube 12. The float 16 may include a hollow cylindrical member 17 that is sufficiently buoyant to float in liquids such as water, gasoline, etc.

The float assembly 16 preferably includes a carriage system 18 that allows the hollow cylindrical member 17 to move only along the length of the tube 12. The tube 12 should be perpendicular to the surface of the liquid 14; therefore, movement of the float 16 assembly along the tube 12 indicates changes in the depth of the liquid 14.

Figure 2:
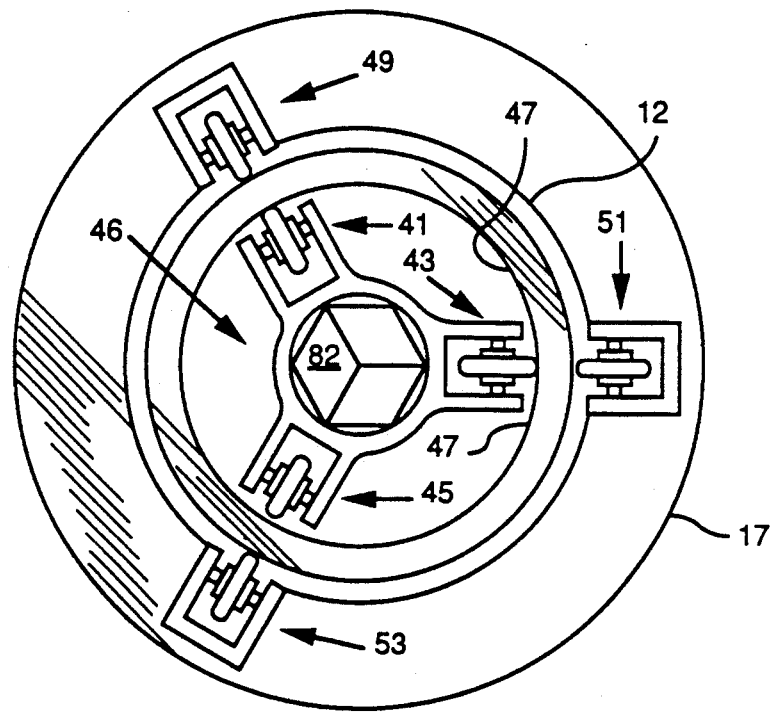
FIG. 2 is a plan view of a float and reflector carriage that may be included in the liquid level sensor of FIG. 1.

Referring to FIGS. 1 and 2, the carriage system 18 may include a pair of rollers 20 and 22 mounted between the side surface 12A of the tube 12 and the inner wall of the hollow cylindrical member 17. The rollers 20 and 22 may be mounted to a frame 26 that is attached to the hollow cylindrical member 17. The frame 26 includes a pair of arms 28 and 30 to which the rollers 20 and 22, respectively, are mounted. The rollers 20 and 22 provide a low coefficient of friction between the float 17 and the tube 12.

Referring to FIG. 1, a magnet 32 is mounted to the frame 26 between the rollers 20 and 22. The poles of the magnet 32 face the outer wall of the tube 12, which should be formed of a material such as PVC, for example. The field of the magnet 32 penetrates the tube 12 without appreciable distortion or attenuation due to the material. As the liquid level 14 changes, the float 16 and magnet 32 move up and down the length of the tube 12.

The carriage system 18 may include a plurality of sets of rollers and magnets like the rollers 20 and 22 and the magnet 32. As shown in FIG. 1, a second set rollers 38 and 40 may be mounted to the inner wall of the hollow cylindrical member 17 opposite the rollers 20 and 22. A magnet 42 may be mounted between the rollers 38 and 40.

Figure 3:
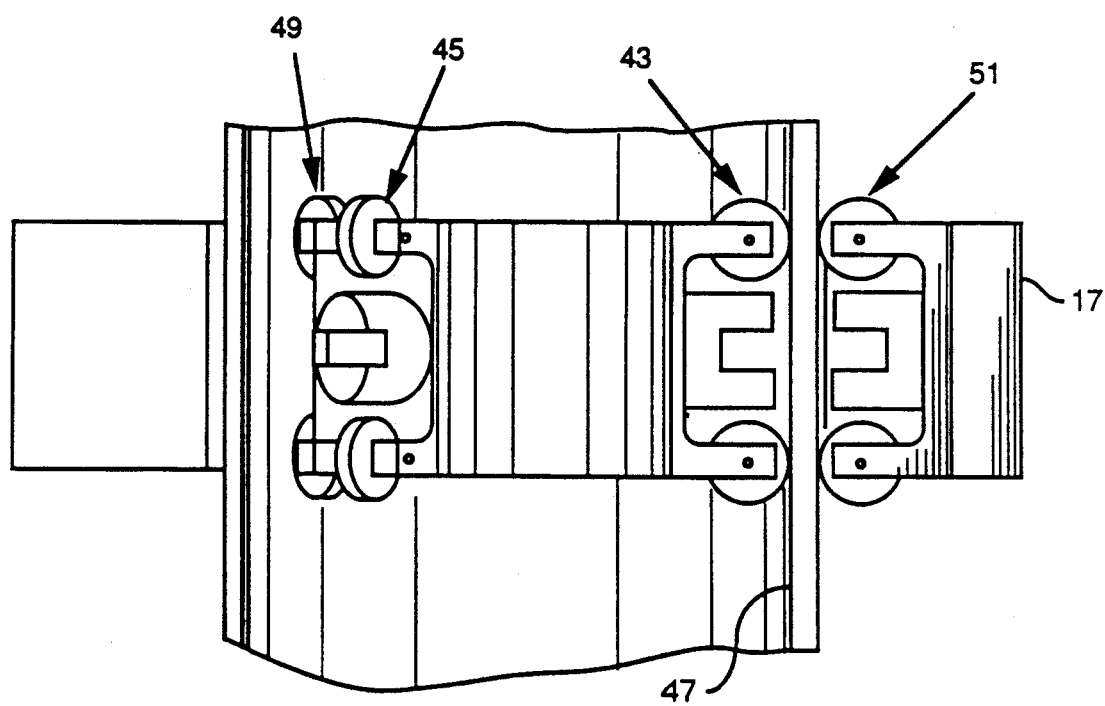
FIG. 3 is a perspective view of the apparatus of FIG. 2.
Figure 4:
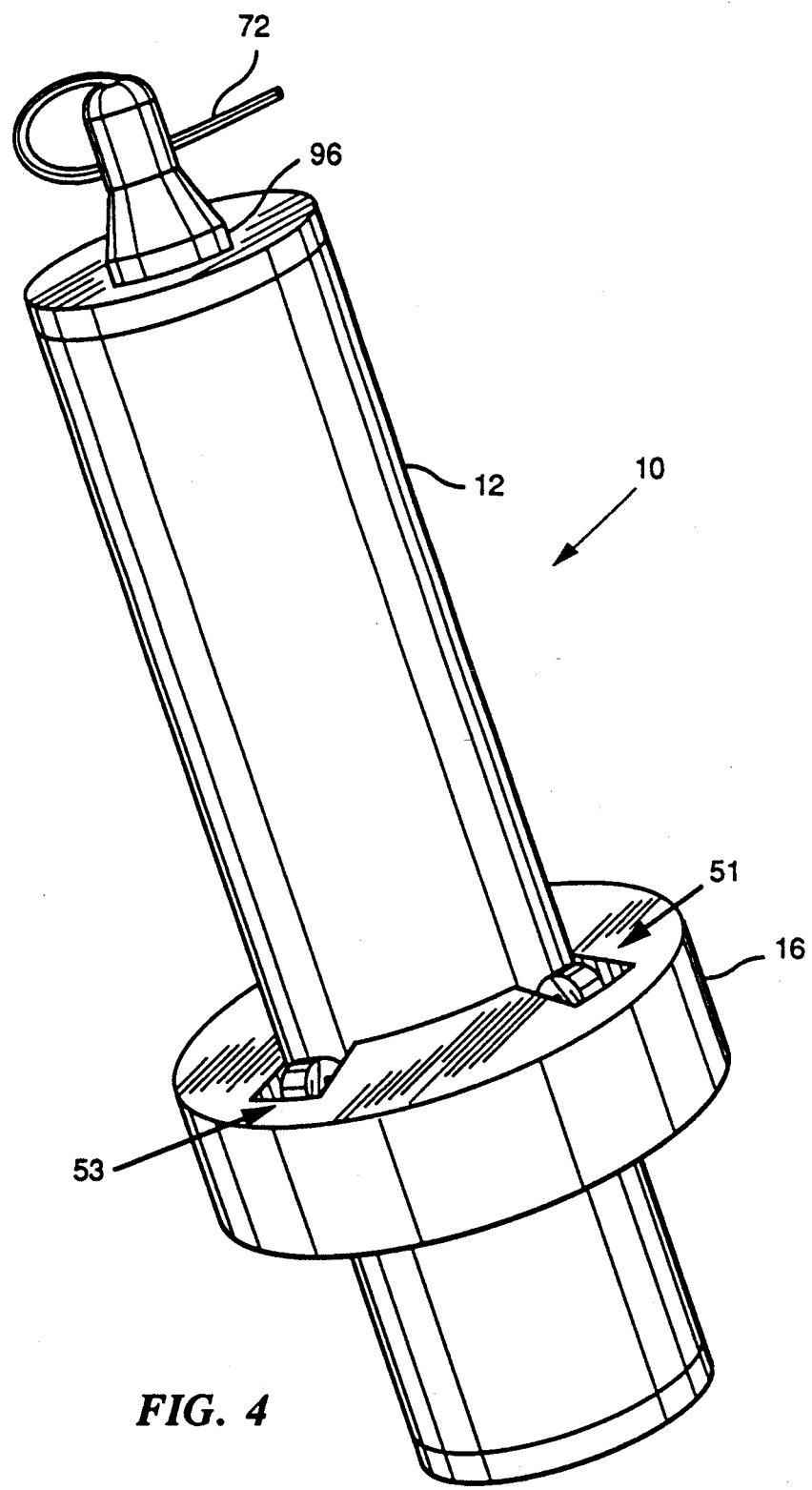
FIG. 4 is a perspective view of a cross sectional view of a liquid level sensor according to the present invention.

Referring to FIGS. 2 and 3, the retroreflector carriage system may include three sets of rollers 41, 43, and 45 spaced approximately 120° apart around the inner wall 47 of the tube 12. Corresponding sets of rollers 49, 51 and 53 are spaced apart about 120° between the hollow cylindrical member 17 and the outer surface of the tube 12. Still other arrangements of the rollers are possible without departing from the scope of the present invention. For example, it may be advantageous to use four sets of rollers (not shown) spaced 90° apart.

Still referring to FIG. 1, a retroreflector carriage 46 is positoned inside the tube 12. The retroreflector carriage 46 is constrained to move only lengthwise inside the tube 12 by a system of rollers preferably mounted to the retroreflector carriage 46 as shown in FIGS. 1 and 2. The arrangement of the rollers inside the tube 12 preferably is symmetrical with the rollers outside the tube 12.

Referring to FIG. 1, for example, the retroreflector carriage 46 includes a pair of arms 50 and 52 that extend toward the inner wall of the tube 12. A pair of rollers 54 and 56 are mounted to the arms 50 and 52, respectively. The arms 50 and 52 are preferably spaced part such that the distance between them is about the same as the distance between the arms 28 and 30. A magnet 58 is mounted between the rollers 54 and 56. The magnet 58 is preferably in angular alignment with the magnet 32, and the poles of the magnets 32 and 58 are arranged to attract one another. Similarly, a magnet 59 may be mounted to the retroreflector carriage 46 opposite the magnet 42.

Similarly, arms 60 and 62 extend from the retroreflector carriage 46 toward the inner walls of the hollow cylindrical member 12 to mount rollers 64 and 66 that are opposite the rollers 38 and 40. The roller carriages and magnets are preferably disposed symmetrically around the circumference of the tube 12 in interior-exterior pairs. There may be several sets of carriages and magnets depending upon the application of the invention. The magnetic pole strengths, the number of magnets and the thickness of the tube wall 12A are chosen such that as the float 16 moves with the liquid level 14, the retroreflector carriage 46 moves with the float 16. Therefore, the total magnetic field must be sufficient to lift the weight of the retroreflector carriage 46 and maintain the correspondence between the inner and outer magnets when the liquid level 14 changes rapidly.

Referring to FIG. 1 an optical source 70, such as a light emitting diode (LED) or a superluminescent diode (SLD) produces a beam of semi-coherent light. A lens system 71 introduces the beam of coherent light to an optical fiber 72. The optical fiber 72 passes through a hole 74 in the end 12B of the tube 12. A seal 76 is formed around the optical fiber 72 to prevent any material from entering or leaving the tube 12. The seal 76 retains the optical fiber 72 so that light emitted from the optical fiber 72 propagates along the center line of the tube 12 to a lens 78. The lens 78 spreads the light from the fiber 72 to form a collimated light beam 80 that propagates along the centerline of the tube 12 to a high efficiency optical reflector 82 mounted inside the carriage 46.

Light exiting the fiber follows the optical path 84–86 from the end of the fiber 72 to the retroreflector 82 and then back to the end of the fiber 72. The lens 78 focuses the reflected light onto the end of the fiber 72, which then guides the reflected light out of the tube 12. The portion of the optical path between the end of the fiber 72 and the retroreflector 82 varies with the position of the float 16 and is designated $L_y$.

The light focused on the end of the fiber 72 propagates to an optical coupler 90, which directs part of the light to a photodetector 92. The photodetector 92 produces an electrical signal indicative of the optical signal incident thereon. An amplifier 94 amplifies the electrical signal output from the photodetector 90 and then sends the amplified signal to a bandpass filter 96 and to a frequency counter 98. The output of the bandpass filter 96 is input to a modulator 100, which is connected to the optical source 70 in a positive feedback mode. The system oscillates at a fundamental frequency that is inversely proportional to the round trip and electrical path delay time.

Since the path from the optical source 70 to the fiber end face 72 and from the fiber end face 72 to the photodetector 92 is fixed, the oscillation frequency is therefore a very precise function of the distance between the fiber end face 72 and the retroreflector 82. The bandpass filter 96 limits the loop to a net gain over only the range of frequencies constituting the fundamental range of the oscillation between minimum and maximum lengths of the variable path $L_v$ and not multiple harmonics. The fixed path length portion of the optical signal path length is deliberately made longer than the variable path length $L_v$ to further suppress ambiguous modes of oscillation.

The oscillation frequency is measured by the frequency counter 98. The frequency count is scaled to appropriate units, such as gallons, by the use of pre-stored tank strapping tables in a microprocessor 102 that receives the output of the frequency counter 98.

The structures illustrated and described herein illustrate the principles of the present invention. Modifications to the illustrated embodiments may be made without departing from the scope of the present invention. Therefore, the present invention includes the subject matter defined by the appended claims and all reasonable equivalents.

What is claimed is:

1. A liquid level sensor system for sensing the level of a fluid in a tank or the like, comprising:
    a float assembly configured for placement in the liquid, the float assembly including float means that is sufficiently buoyant to move the float assembly vertically in response to changes in the level of the liquid;
    a reflector coupled to the float means such that the position of the reflector is a function of the liquid level;
    a light source;
    means for directing a light signal from the light source toward the reflector;
    means for modulating the light source with a signal indicative of the intensity of light reflected from the reflector such that the intensity of the light output from the light source oscillates at a frequency that is a function of the liquid level.

2. The system of claim 1 further comprising:
    a tube formed for placement in the liquid, the tube being formed to have an outer surface and a lengthwise bore that defines an inner surface, the float assembly further comprising a buoyant member placed around the tube and constrained to movement only lengthwise along the tube in response to changes in the liquid level; and
    carriage means placed inside the tube for moving with the float in response to changes in the liquid level, the reflector being mounted to the carriage.

3. A liquid level sensor system for sensing the level of a fluid in a tank or the like, comprising:
    a float assembly configured for placement in the liquid, the float assembly including float means being sufficiently buoyant to move the float assembly vertically in response to changes in the level of the liquid:
    a tube formed for placement in the liquid, the tube being formed to have an outer surface and a lengthwise bore that defines an inner surface, the float assembly further comprising a buoyant member placed around the tube and constrained to movement only lengthwise along the tube in response to changes in the liquid level:
    carriage means placed inside the tube for moving with the float in response to changes in the liquid level, the reflector being mounted to the carriage;
    a system of rollers mounted between the buoyant member and the tube to provide low friction contact between the float assembly and the outer surface of the tube;
    a reflector coupled to the float means such that the position of the reflector is a function of the liquid level;
    means for directing a light signal toward the reflector;
    means for processing the light reflected from the reflector such that the frequency of the oscillation in the light amplitude is a function of the liquid level; and
    means for processing the frequency of the light signal to determine the liquid level.

4. The system of claim 3 wherein the tube is closed at both ends.

5. The system of claim 3 wherein the carriage means and the float are magnetically coupled together so that the carriage means moves lengthwise inside the tube in response to movement of the float assembly as the liquid level changes.

6. A liquid level sensor system for sensing the level of a fluid in a tank or the like, comprising:
    a float assembly configured for placement in the liquid, the float assembly including float means being sufficiently buoyant to move the float assembly vertically in response to changes in the level of the liquid;
    a reflector coupled to the float means such that the position of the reflector is a function of the liquid level:
    means for directing a light signal toward the reflector;
    means for processing the light reflected from the reflector such that the frequency of the oscillation in the light amplitude is a function of the liquid level;
    means for processing the frequency of the light signal to determine the liquid level;
    a tube formed for placement in the liquid, the tube being formed to have an outer surface and a lengthwise bore that defines an inner surface, the float assembly further comprising a buoyant member placed around the tube and constrained to movement only lengthwise along the tube in response to changes in the liquid level;
    carriage means placed inside the tube for moving with the float in response to changes in the liquid level, the reflector being mounted to the carriage;
    means for magnetically coupling the carriage means and the float together so that the carriage means moves lengthwise inside the tube in response to movement of the float assembly as the liquid level changes;
    the float means further including a first system of rollers mounted between the buoyant member and the tube to provide low friction contact between the float assembly and the outer surface of the tube: and
    the carriage means including a frame and a system of rollers mounted between the frame and the inner surface of the tube to provide low friction contact between the carriage and the tube.

7. The system of claim 1, further including:
    a single optical fiber having a first end arranged to receive light output from the light source and a second end arranged to direct light from the source toward the reflector;
    a lens fixed in the tube and arranged to focus light reflected from the reflector onto the second end of the optical fiber so that the optical fiber guides the reflected light back toward the optical source, the length of the optical fiber and the placement of the lens in the tube defining a fixed optical path length, the distance between the fiber end and the reflector defining a variable optical path that depends on the liquid level, the fixed optical path being longer than the variable optical path to suppress undesired modes of oscillation of the optical signal amplitude; and a directional coupler for directing a portion of the reflected light out of the optical fiber and isolating the reflected light from the light output from the light source: and a photodetector that forms an electrical signal indicative of the reflected light.

8. The system of claim 7, further including:

a bandpass filter for filtering the electrical signal for limiting it to a range of frequencies corresponding to selected minimum and maximum liquid levels;

a modulator connected between the bandpass filter and the optical source electrical source such that the optical source produces amplitude modulated optical signals having a modulation frequency indicative of the distance between the second end of the optical fiber and the reflector;

a frequency counter connected to receive the electrical signal from the detector for determining the modulation frequency of the reflected light; and computing means connected to the frequency counter for computing the liquid level as a function of the modulation frequency of the reflected light.

9. A method for sensing the level of a fluid in a tank or the like, comprising the steps of:

placing a float assembly in the liquid;

forming the float assembly to include float means that is sufficiently buoyant to move the float assembly vertically in response to changes in the level of the liquid;

coupling a reflector to the float means such that the position of the reflector is a function of the liquid level;

directing a light signal from a light source toward the reflector;

modulating the light source with a signal indicative of the intensity of light reflected from the reflector such that the intensity of the light output from the light source oscillates at a frequency that is a function of the liquid level: and processing the frequency of oscillation of the intensity of the light signal to determine the liquid level.

10. The method of claim 9 further comprising the steps of:

forming a tube formed for placement in the liquid such that the tube has an outer surface and a lengthwise bore that defines an inner surface;

forming the float assembly to further comprise a buoyant member;

placing the buoyant member around the tube;

constraining the buoyant member to movement only lengthwise along the tube in response to changes in the liquid level; and placing carriage means inside the tube such that the carriage moves with the float in response to changes in the liquid level; and mounting the reflector to the carriage.

11. A method for sensing the level of a fluid in a tank or the like, comprising the steps of;

placing a float assembly in the liquid;

forming the float assembly to include float means that is sufficiently buoyant to move the float assembly vertically in response to changes in the level of the liquid;

forming the float assembly to further include a system of rollers mounted between the buoyant member and the tube to provide low friction contact between the float assembly and the outer surface of the tube;

coupling a reflector to the float means such that the position of the reflector is a function of the liquid level;

directing a light signal toward the reflector;

processing the light reflected from the reflector in order to produce a modulation frequency that is function of the liquid level;

processing the frequency of the light signal to determine the liquid level, forming a tube formed for placement in the liquid such that the tube has an outer surface and a lengthwise bore that defines an inner surface;

forming the float assembly to further comprise a buoyant member;

placing the buoyant member around the tube;

constraining the buoyant member to movement only lengthwise along the tube in response to changes in the liquid level;

placing carriage means inside the tube such that the carriage moves with the float in response to changes in the liquid level; and mounting the reflector to the carriage.

12. The method of claim 11 including the step of closing the tube at both ends.

13. The method of claim 11 including the step of coupling the carriage means and the float together magnetically so that the carriage means moves lengthwise inside the tube in response to movement of the float assembly as the liquid level changes.

14. A method for sensing the level of a fluid in a tank or the like, comprising the steps of;

placing a float assembly in the liquid;

forming the float assembly to include float means that is sufficiently buoyant to move the float assembly vertically in response to changes in the level of the liquid;

coupling a reflector to the float means such that the position of the reflector is a function of the liquid level;

directing a light signal toward the reflector;

processing the light reflected from the reflector in order to produce a modulation frequency that is function of the liquid level; and processing the frequency of the light signal to determine the liquid level.

forming a tube formed for placement in the liquid such that the tube has an outer surface and a lengthwise bore that defines an inner surface;

forming the float assembly to further comprise a buoyant member;

placing the buoyant member around the tube;

constraining the buoyant member to movement only lengthwise along the tube in response to changes in the liquid level; and placing carriage means inside the tube such that the carriage moves with the float in response to changes in the liquid level;

coupling the carriage means and the float together magnetically so that the carriage means moves lengthwise inside the tube in response to movement of the float assembly as the liquid level changes; and mounting the reflector to the carriage;

forming the float means to further include a first system of rollers mounted between the buoyant member and the tube to provide low friction contact between the float assembly and the outer surface of the tube; and forming the carriage means to include a frame and a system of rollers mounted between the frame and the inner surface of the tube to provide low friction contact between the carriage and the tube.

15. The method of claim 9, further including the steps of:

arranging an optical fiber to receive light output from the light source at a first end and to direct light from the source toward the reflector at a second end;

fastening a lens in the tube and arranging the lens to focus light reflected from the reflector onto the second end of the optical fiber so that the optical fiber guides the reflected light back toward the optical source, the length of the optical fiber and the placement of the lens in the tube defining a fixed optical path length, the distance between the fiber end and the reflector defining a variable optical path that depends on the liquid level, the fixed optical path being longer than the variable optical path to suppress undesired modes of oscillation; and directing a portion of the reflected light out of the optical fiber to a photodetector that forms an electrical signal indicative of the reflected light.

16. The method of claim 15, further including the steps of:

filtering the electrical signal with a bandpass filter for limiting the electrical signal to a range of frequencies corresponding to selected minimum and maximum liquid levels;

connecting a modulator between the bandpass filter and the optical source to control the drive current of the electrical source such that the optical source produces amplitude modulated optical signals having a modulation frequency indicative of the liquid level;

connecting a frequency counter to receive the electrical signal from the detector for determining amplitude modulation frequency of the reflected light; and computing the liquid level as a function of the amplitude modulation frequency of the reflected light.

17. A liquid level sensor system for sensing the level of a fluid in a tank or the like, comprising:

a float assembly configured for placement in the liquid, the float assembly including a float that is sufficiently buoyant to move the float assembly vertically in response to changes in the level of the liquid;

a reflector coupled to the float such that the position of the reflector is a function of the liquid level;

light source means for producing an optical signal;

an optical fiber having a first end arranged to receive the optical signal and a second end arranged to direct light from the light source toward the reflector such that the distance from the optical source to the second end of the optical fiber defines a fixed optical path and the distance between the second end of the optical fiber and the reflector defines a variable optical path length that is a function of the liquid level;

means for introducing light reflected from the reflector into the optical fiber to form an optical feedback signal;

directional coupling means connected to the optical fiber for coupling the optical feedback signal out of the optical fiber;

means for forming an electrical signal indicative of the intensity of the optical feedback signal; and means for modulating the light source with the electrical signal such that the amplitude of the optical signal oscillates at a frequency that is inversely proportional to the sum of the transit time of the optical signals through the fixed and variable paths and the delay time for the electrical signals to propagate from the detector to the light source.

* * * * *